(12) United States Patent
Toizumi et al.

(10) Patent No.: US 11,837,023 B2
(45) Date of Patent: Dec. 5, 2023

(54) DETECTION SYSTEM, DETECTION METHOD, AND COMPUTER PROGRAM

(71) Applicant: NEC Corporation, Tokyo (JP)

(72) Inventors: Takahiro Toizumi, Tokyo (JP); Koichi Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/640,160

(22) PCT Filed: Sep. 15, 2020

(86) PCT No.: PCT/JP2020/034900
§ 371 (c)(1),
(2) Date: Mar. 3, 2022

(87) PCT Pub. No.: WO2022/059066
PCT Pub. Date: Mar. 24, 2022

(65) Prior Publication Data
US 2022/0392260 A1 Dec. 8, 2022

(51) Int. Cl.
*G06K 9/00* (2022.01)
*G06V 40/18* (2022.01)
*G06V 10/77* (2022.01)
*G06T 3/60* (2006.01)

(52) U.S. Cl.
CPC ............... *G06V 40/18* (2022.01); *G06T 3/60* (2013.01); *G06V 10/7715* (2022.01); *G06V 2201/07* (2022.01)

(58) Field of Classification Search
CPC ............... G06V 40/18; G06V 10/7715; G06V 2201/07; G06T 3/60
See application file for complete search history.

(56) References Cited

U.S. PATENT DOCUMENTS

| 2006/0188144 | A1* | 8/2006 | Sasaki .................. | G06V 40/171 345/473 |
| 2009/0010544 | A1* | 1/2009 | Li ........................ | G06V 40/171 382/190 |
| 2010/0027890 | A1* | 2/2010 | Yoshinaga ........... | G06V 40/193 382/195 |
| 2010/0054548 | A1* | 3/2010 | Inada ................... | G06V 40/193 382/117 |

(Continued)

FOREIGN PATENT DOCUMENTS

| JP | 2003-132355 A | 5/2003 |
| JP | 2003-317102 A | 11/2003 |

(Continued)

OTHER PUBLICATIONS

International Search Report for PCT Application No. PCT/JP2020/034900, dated Nov. 17, 2020.

*Primary Examiner* — Avinash Yentrapati

(57) ABSTRACT

A detection system (10) includes: an acquisition unit (110) configured to acquire an image including a living body; and a detection unit (120) configured to detect, from the image, a feature figure corresponding to an appropriately circular first part on the living body, and feature points corresponding to a second part around the first part on the living body. According to such a detection system, the first part and the second part with different features in shape can be individually detected appropriately.

7 Claims, 22 Drawing Sheets

(56) References Cited

U.S. PATENT DOCUMENTS

| | | | | |
|---|---|---|---|---|
| 2014/0056529 A1* | 2/2014 | Ruan | ...................... | G06V 10/48 |
| | | | | 382/199 |
| 2014/0072230 A1* | 3/2014 | Ruan | ........................ | G06T 7/12 |
| | | | | 382/199 |
| 2018/0218212 A1* | 8/2018 | Yoshikawa | ............ | G06V 40/67 |
| 2019/0213409 A1* | 7/2019 | Tsuda | ..................... | G06V 40/19 |

FOREIGN PATENT DOCUMENTS

| | | | |
|---|---|---|---|
| JP | 2006-004294 | A | 1/2006 |
| JP | 2006-172209 | A | 6/2006 |
| JP | 2007-213377 | A | 8/2007 |
| JP | 2006-152608 | A | 7/2008 |
| JP | 2014-075098 | A | 4/2014 |
| JP | 2018-045437 | A | 3/2018 |
| JP | 2018-124733 | A | 8/2018 |

\* cited by examiner

REGULAR CIRCLE  VERTICALLY LONG ELLIPSE  HORIZONTALLY LONG ELLIPSE  OBLIQUE ELLIPSE

DETECTION SYSTEM, DETECTION METHOD, AND COMPUTER PROGRAM

This application is a National Stage Entry of PCT/JP2020/034900 filed on Sep. 15, 2020, the contents of all of which are incorporated herein by reference, in their entirety.

TECHNICAL FIELD

The present disclosure relates to a technical field of a detection system, a detection method, and a computer program that detect part of a living body from an image.

BACKGROUND ART

As a system of this type, there is known a system that detects an area around an eye of a living body from an image. For example, Patent Reference 1 discloses that a pupil circle and an iris circle are detected from an image. Patent Reference 2 discloses that a face is detected from an image, and an eye is detected based on position information on the face. Patent Reference 3 discloses that feature points are extracted from a face image. Patent Reference 4 discloses that circular areas are detected in a ROI (Region of Interest), and a plurality of areas to be candidates for the iris are detected.

CITATION LIST

Patent Literature

Patent Literature 1

Japanese Patent Laid-Open No. 2003-317102 A

Patent Literature 2

Japanese Patent Laid-Open No. 2007-213377 A

Patent Literature 3

Japanese Patent Laid-Open No. 2014-075098 A

Patent Literature 4

Japanese Patent Laid-Open No. 2018-045437 A

SUMMARY

Technical Problem

In detection where an image is an input, a conceivable method is of detecting feature points and a feature figure. However, none of the prior art references cited above mention detecting both feature points and a feature figure, and there is room for improvement.

An object of the present disclosure is to provide a detection system, a detection method, and a computer program that can solve the above problem.

Solution to Problem

A detection system according to an example aspect of the present invention includes: an acquisition unit configured to acquire an image including a living body; and a detection unit configured to detect, from the image, a feature figure corresponding to an appropriately circular first part on the living body, and feature points corresponding to a second part around the first part on the living body.

A detection method according to an example aspect of the present invention includes: acquiring an image including a living body; and detecting, from the image, a feature figure corresponding to an appropriately circular first part on the living body, and feature points corresponding to a second part around the first part on the living body.

A computer program according to an example aspect of the present invention allows a computer to: acquire an image including a living body; and detect, from the image, a feature figure corresponding to an appropriately circular first part on the living body, and feature points corresponding to a second part around the first part on the living body.

DESCRIPTION OF EXAMPLE EMBODIMENTS

Hereinafter, embodiments of a detection system, a detection method, and a computer program will be described with reference to drawings.

First Embodiment

A detection system according to a first embodiment is described with reference to FIGS. 1 to 4.
(Hardware Configuration)

Figure 1:
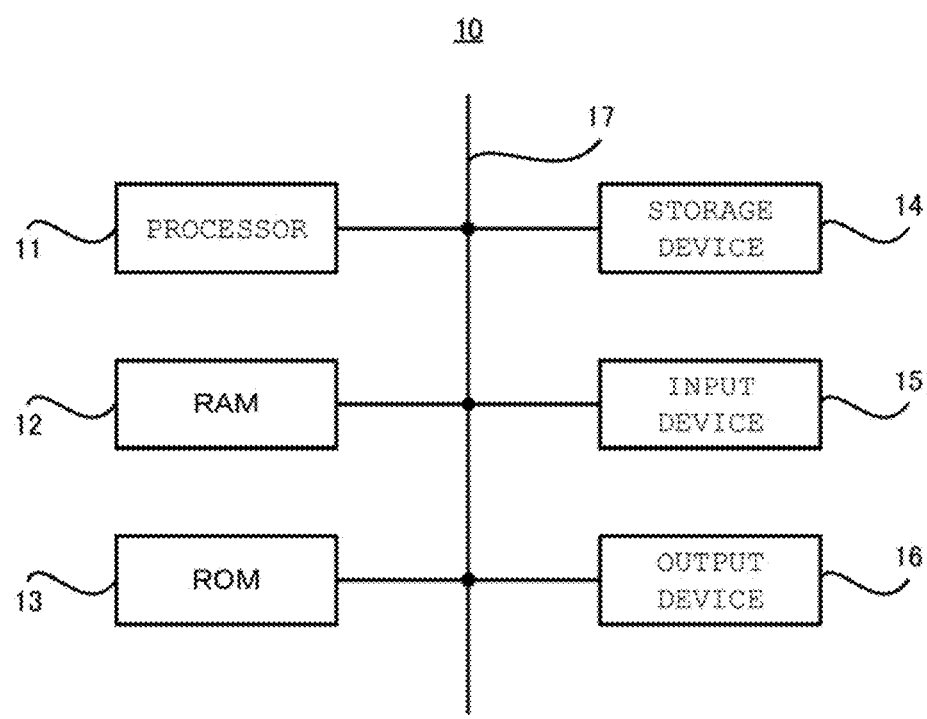
FIG. 1 is a block diagram showing a hardware configuration of a detection system according to a first embodiment.

First, a hardware configuration of the detection system according to the first embodiment is described with reference to FIG. 1. FIG. 1 is a block diagram showing the hardware configuration of the detection system according to the first embodiment.

As shown in FIG. 1, the detection system 10 according to the first embodiment includes a processor 11, a RAM (Random Access Memory) 12, a ROM (Read Only Memory) 13, and a storage device 14. The detection system 10 may further include an input device 15 and an output device 16. The processor 11, the RAM 12, the ROM 13, the storage device 14, the input device 15, and the output device 16 are connected to each other through a data bus 17.

The processor 11 reads a computer program. For example, the processor 11 is configured to read the computer program stored in at least one of the RAM 12, the ROM 13, and the storage device 14. Alternatively, the processor 11 may read the computer program stored in a computer-readable recording medium, by using an undepicted recording media reader. The processor 11 may acquire (that is, may read) the computer program, via a network interface, from an undepicted device disposed outside of the detection system 10. The processor 11 controls the RAM 12, the storage device 14, the input device 15, and the output device 16 by executing the read computer program. In the present embodiment in particular, when the processor 11 executes the read computer program, a functional block for detecting part of a living body from an image is implemented in the processor 11. For the processor 11, one of a CPU (Central Processing Unit), a GPU (Graphics Processing Unit), an FPGA (field-programmable gate array), a DSP (Demand-Side Platform), and an ASIC (Application Specific Integrated Circuit) may be used, or two or more thereof may be used in parallel.

The RAM 12 transitorily stores the computer program to be executed by the processor 11. The RAM 12 transitorily stores data transitorily used by the processor 11 when the processor 11 executes the computer program. The RAM 12 may be, for example, a D-RAM (Dynamic RAM).

The ROM 13 stores the computer program to be executed by the processor 11. The ROM 13 may store other fixed data. The ROM 13 may be, for example, a P-ROM (Programmable ROM).

The storage device 14 stores data that the detection system 10 retains for a long time. The storage device 14 may operate as a transitory storage device for the processor 11. The storage device 14 may include at least one of, for example, a hard disk device, a magneto-optical disk device, an SSD (Solid State Drive), and a disk array device.

The input device 15 is a device that receives an input instruction from a user of the detection system 10. The input device 15 may include at least one of, for example, a keyboard, a mouse, and a touch panel.

The output device 16 is a device that outputs information related to the detection system 10 to the outside. For example, the output device 16 may be a display device (for example, a display) capable of displaying the information related to the detection system 10.
(Functional Configuration)

Figure 2:
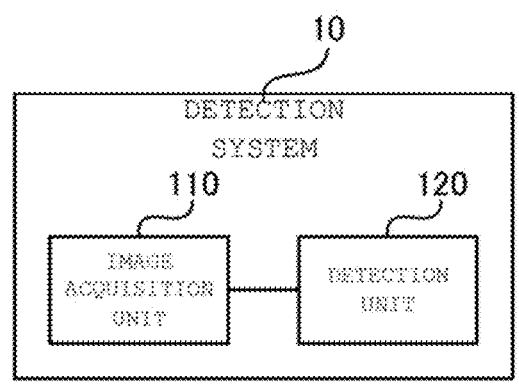
FIG. 2 is a block diagram showing a functional configuration of the detection system according to the first embodiment.

Next, a functional configuration of the detection system 10 according to the first embodiment is described with reference to FIG. 2. FIG. 2 is a block diagram showing the functional configuration of the detection system according to the first embodiment.

In FIG. 2, the detection system 10 according to the first embodiment is configured as a system that detects part of a living body from an image. The detection system 10 includes, as processing blocks for implementing functions of the detection system 10, or as physical processing circuitry, an image acquisition unit 110 and a detection unit 120. The image acquisition unit 110 and the detection unit 120 can be implemented by, for example, the above-described processor 11 (see FIG. 1).

The image acquisition unit 110 is configured to be able to acquire an image inputted into the detection system 10 (that is, an image subject to detection). The image acquisition unit 110 may include an accumulation unit configured to accumulate acquired images. A configuration is made such that information related to the image acquired by the image acquisition unit 110 is outputted to the detection unit 120.

The detection unit 120 is configured to be able to detect part of a living body from the image acquired by the image acquisition unit 110. Specifically, the detection unit 120 is configured to be able to detect a feature figure corresponding to a first part of the living body, and feature points corresponding to a second part of the living body. The "first part" here is a part having an approximately circular shape on the living body. On the other hand, the "second part" is a part located around the first part on the living body. Note that it may be preset which parts of a living body are the first part and the second part, respectively. In such a case, a plurality of parts of different types may be set as first parts, and a plurality of parts of different types may be set as second parts. The detection unit 120 may include a function of outputting information related to the detected feature points and feature figure.
(Flow of Operation)

Figure 3:
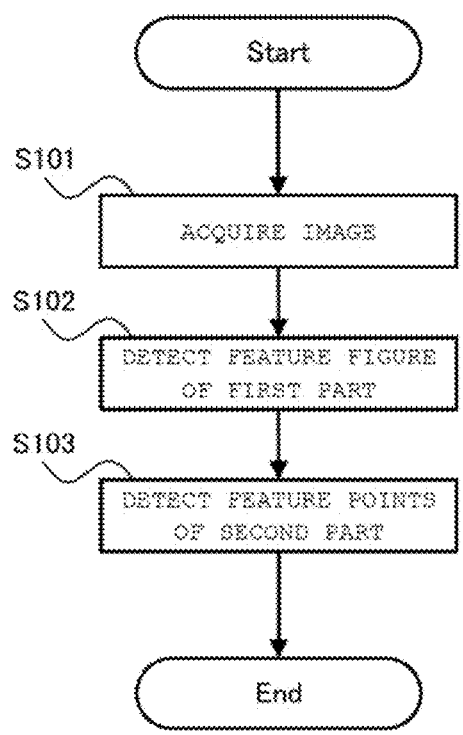
FIG. 3 is a flowchart showing a flow of operation of the detection system according to the first embodiment.

Next, a flow of operation of the detection system 10 according to the first embodiment is described with reference to FIG. 3. FIG. 3 is a flowchart showing the flow of the operation of the detection system according to the first embodiment.

As shown in FIG. 3, when the detection system 10 according to the first embodiment operates, first, the image acquisition unit 110 acquires an image (step S101).

Subsequently, the detection unit 120 detects a feature figure corresponding to the first part from the image acquired by the image acquisition unit 110 (step S102). The detection unit 120 further detects feature points corresponding to the second part from the image acquired by the image acquisition unit 110 (step S103). The detected feature figure and feature points can be represented by coordinates, a mathematical formula, or the like. Note that the processes in steps S102 and S103 may be sequentially executed, or may be simultaneously executed in parallel. In other words, order in which the feature figure corresponding to the first part and the feature points corresponding to the second part are detected is not limited, and a configuration may be made such that the feature figure and the feature points are detected at the same time.

(Specific Examples of Feature Figure)

Figure 4:
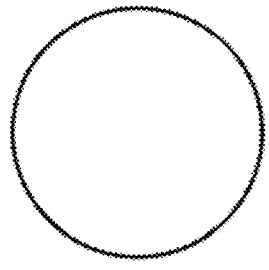
FIG. 4 shows examples of a feature figure detected by the detection system according to the first embodiment.
Figure 4:
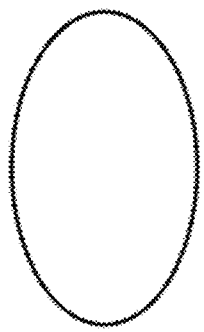
Figure 4:
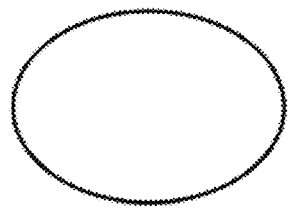
Figure 4:
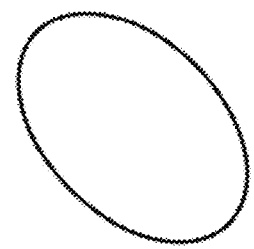

Next, specific examples of the feature figure detected by the detection system 10 according to the first embodiment are described with reference to FIG. 4. FIG. 4 shows examples of the feature figure detected by the detection system according to the first embodiment.

As shown in FIG. 4, in the detection system 10 according to the first embodiment, the detection unit 120 detects a circle (including an ellipse), as the feature figure corresponding to the first part. Circles detected by the detection unit 120 may include, in addition to a regular circle, a vertically long ellipse, a horizontally long ellipse, and an oblique ellipse (that is, an ellipse rotated at an arbitrary angle). It may be preset what kinds of circles are to be detected in actuality. For example, a shape corresponding to a part of a living body intended to be detected may be set. Moreover, the detection unit 120 may be configured to be able to detect a partially broken circle or a circle partially obstructed from view.

Technical Effects

Next, technical effects achieved by the detection system 10 according to the first embodiment are described.

As described with FIGS. 1 to 3, in the detection system 10 according to the first embodiment, a feature figure corresponding to the first part and feature points corresponding to the second part are detected from an image. In other words, the first part and the second part are detected through different methods. Thus, the first part and the second part, which have different features in shape, can be individually detected appropriately from an image obtained by picking up an image of a living body.

Second Embodiment

A detection system 10 according to a second embodiment is described with reference to FIGS. 5 to 7. Note that the second embodiment is different from the above-described first embodiment only in part of configuration and operation, and, for example, a hardware configuration may be similar to that of the first embodiment (see FIG. 1). Accordingly, in the following, a description of part overlapping with the embodiment described already is omitted as appropriate.

(Functional Configuration)

First, a functional configuration of the detection system 10 according to the second embodiment is described with reference to FIG. 5. FIG. 5 is a block diagram showing the functional configuration of the detection system according to the second embodiment. Note that in FIG. 5, elements similar to the constitutional elements shown in FIG. 2 are denoted by the same reference numbers as in FIG. 2.

Figure 5:
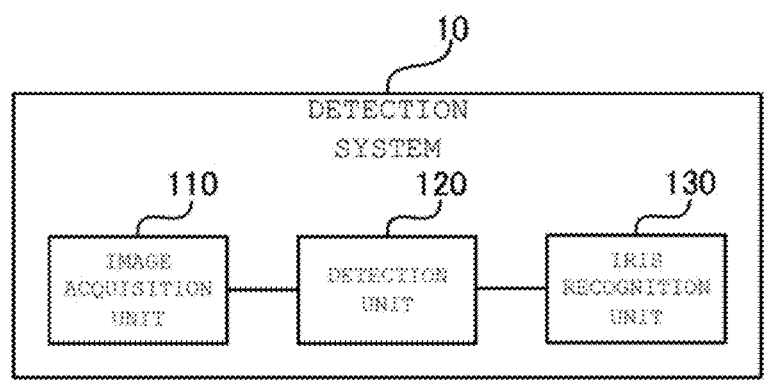
FIG. 5 is a block diagram showing a functional configuration of a detection system according to a second embodiment.

As shown in FIG. 5, the detection system 10 according to the second embodiment includes, as processing blocks for implementing functions of the detection system 10, or as physical processing circuitry, an image acquisition unit 110, a detection unit 120, and an iris recognition unit 130. In other words, the detection system 10 according to the second embodiment includes the iris recognition unit 130, in addition to the constitutional elements in the first embodiment (see FIG. 2). Note that the iris recognition unit 130 can be implemented by, for example, the above-described processor 11 (see FIG. 1).

The iris recognition unit 130 is configured to be able to execute iris recognition by using feature points and a feature figure detected by the detection unit 120. For example, the iris recognition unit 130 is configured to be able to identify an iris region, based on the feature points corresponding to eyelids, which are an example of the second part, and on the feature figures corresponding to an iris and a pupil, which are examples of the first parts (see FIG. 7), and able to execute an iris recognition process using the iris region. The iris recognition unit 130 may include a function of outputting a result of the iris recognition. Moreover, the iris recognition unit 130 may be configured to have part of the iris recognition process be executed outside of the system (for example, be executed by an external server, cloud computing, or the like).

(Flow of Operation)

Next a flow of operation of the detection system 10 according to the second embodiment is described with reference to FIG. 6. FIG. 6 is a flowchart showing the flow of the operation of the detection system according to the second embodiment. Note that in FIG. 6, processes similar to the processes shown in FIG. 3 are denoted by the same reference numbers as in FIG. 3.

Figure 6:
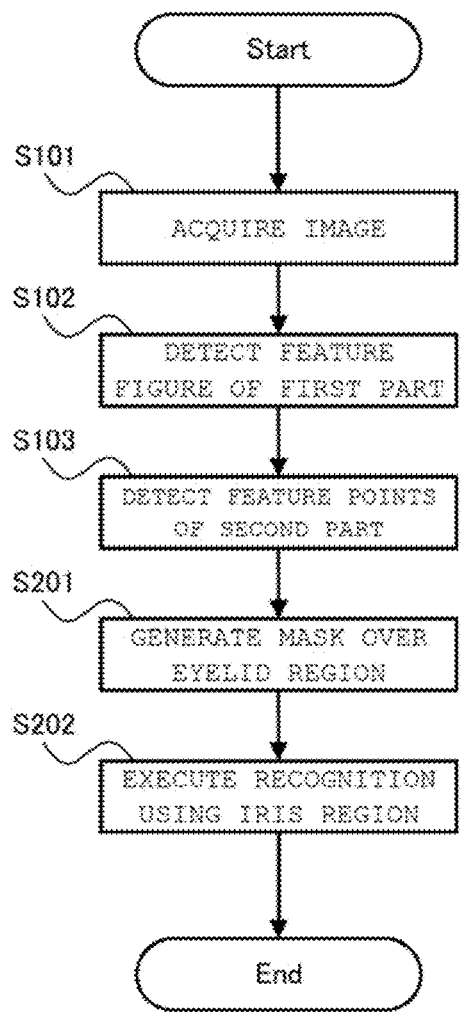
FIG. 6 is a flowchart showing a flow of operation of the detection system according to the second embodiment.

As shown in FIG. 6, when the detection system 10 according to the second embodiment operates, first, the image acquisition unit 110 acquires an image (step S101). Thereafter, the detection unit 120 detects feature figures corresponding to the first parts from the image acquired by the image acquisition unit 110 (step S102). The detection unit 120 further detects feature points corresponding to the second part from the image acquired by the image acquisition unit 110 (step S103).

Subsequently, the iris recognition unit 130 identifies an eyelid region (that is, a region where eyelids exit) from the feature points corresponding to the eyelids, and generates a mask over the eyelid region (step S201). The mask over the eyelid region is used to remove the eyelid region that is not required for the iris recognition (in other words, does not have iris information). Thereafter, the iris recognition unit 130 identifies an iris region (that is, a region where the iris information can be obtained) from the feature figures corresponding to an iris and a pupil, and executes the iris recognition using the iris region (step S202). A detailed description of specific processing content of the iris recognition is omitted here because an existing technique can be adopted as appropriate.

(Example of Detection of Area around Eye)

Next, detection of the feature figures and the feature points by the detection system 10 according to the second embodiment is described with reference to FIG. 7. FIG. 7 shows an example of the detection of the feature figures and the feature points by the detection system according to the second embodiment.

Figure 7:
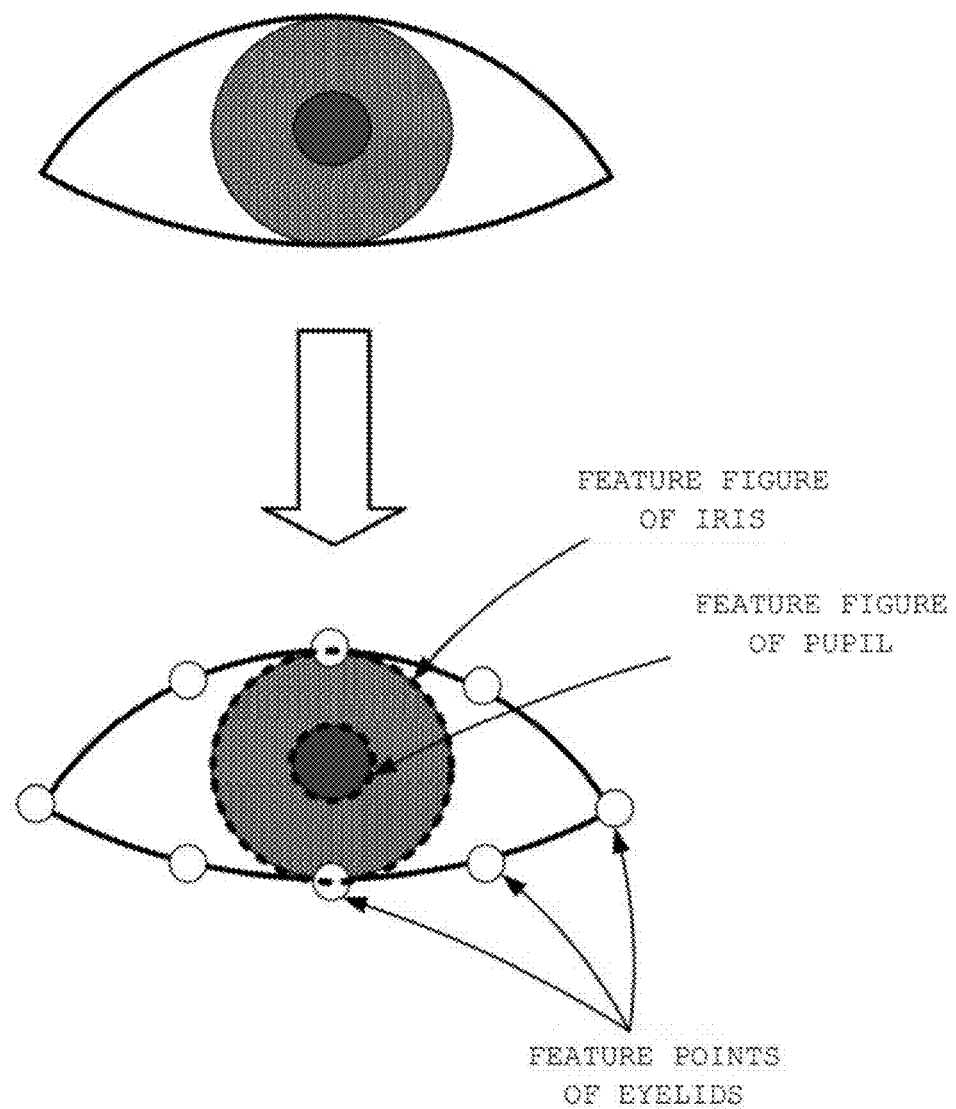
FIG. 7 shows an example of detection of feature figures and feature points by the detection system according to the second embodiment.

As shown in FIG. 7, in the detection system 10 according to the second embodiment, the "iris and pupil" are detected as the first parts, and the "eyelids" are detected as the second part.

The detection unit 120 detects a circle corresponding to the iris and a circle corresponding to the pupil. Note that the detection unit 120 may be configured to detect only any one of the circle corresponding to the iris and the circle corresponding to the pupil. The iris and the pupil are suitable to be detected as approximately circular feature figures because shapes of the iris and the pupil are nearly circles. If an attempt is made to detect the iris and the pupil as feature points (for example, as points on a circumference), the number and positions of the points depend on a system design and directly affect detection accuracy. However, when the iris and the pupil are detected as circles, positions of the iris and the pupil can be determined as formulas of the circles. A circle formula is uniquely determined, and therefore does not depend on a system design or affect detection accuracy. In such respects as well, it can be said that the iris is suitable to be detected as a circle.

Moreover, the detection unit 120 detects a plurality of feature points indicating a position (an outline) of the eyelids. In the example shown in the drawing, the detection unit 120 detects two feature points corresponding to inner and outer corners of an eye, three feature points corresponding to the upper eyelid, and three feature points corresponding to the lower eyelid. Note that the above-described number of the feature points is only an example, and a configuration may be made such that fewer feature points are detected, or more feature points are detected. Eyelids have relatively large individual differences among living bodies, and there are considerable differences in shape among individuals, such as single eyelids and double eyelids, and upturned eyes and downturned eyes. Accordingly, the eyelids are suitable to be detected not as a feature figure but as feature points. Note that although eyelids have individual differences in shape, there is a commonality, which is that eyelids are located around an iris and a pupil. Accordingly, if the eyelids are detected along with the feature figures, the eyelids can be relatively easily detected as feature points.

Technical Effects

Next, technical effects achieved by the detection system 10 according to the second embodiment are described.

As described with FIGS. 5 to 7, in the detection system 10 according to the second embodiment, the iris recognition is executed by using detected feature figures and feature points. In the present embodiment in particular, since a plurality of parts existing around an eye are appropriately detected, the iris recognition can be executed appropriately. Note that in the example shown in FIG. 5, since coordinates of the inner and outer corners of the eye, and radii of the circles of the iris and the pupil are known, a ratio of a difference between a distance from the inner corner to the outer corner of the eye and the radius of one of the two circles, to a difference between the distance and the radius of the other circle may be matched against data in the iris recognition and weighted.

Third Embodiment

A detection system 10 according to a third embodiment is described with reference to FIGS. 8 and 9. Note that the third embodiment is different from each of the above-described embodiments only in part of configuration and operation, and, for example, a hardware configuration may be similar to that of the first embodiment (see FIG. 1). Accordingly, in the following, a description of part overlapping with the embodiments described already is omitted as appropriate.
(Functional Configuration)

First, a functional configuration of the detection system 10 according to the third embodiment is described with reference to FIG. 8. FIG. 8 is a block diagram showing the functional configuration of the detection system according to the third embodiment. Note that in FIG. 8, elements similar to the constitutional elements shown in FIGS. 2 and 5 are denoted by the same reference numbers as in FIGS. 2 and 5.

Figure 8:
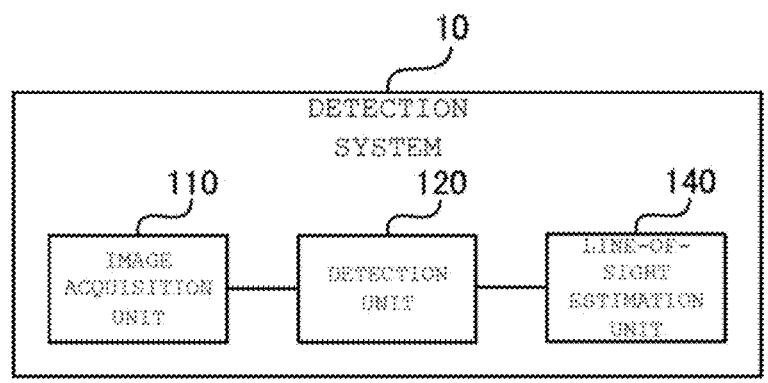
FIG. 8 is a block diagram showing a functional configuration of a detection system according to a third embodiment.

As shown in FIG. 8, the detection system 10 according to the third embodiment includes, as processing blocks for implementing functions of the detection system 10, or as physical processing circuitry, an image acquisition unit 110, a detection unit 120, and a line-of-sight estimation unit 140. In other words, the detection system 10 according to the third embodiment further includes the line-of-sight estimation unit 140, in addition to the constitutional elements in the first embodiment (see FIG. 2). Note that the line-of-sight estimation unit 140 can be implemented by, for example, the above-described processor 11 (see FIG. 1).

The line-of-sight estimation unit 140 is configured to be able to execute line-of-sight direction estimation by using feature points and a feature figure detected by the detection unit 120. Specifically, the line-of-sight estimation unit 140 is configured to be able to execute a process of estimating a direction of a line of sight, based on the "feature points corresponding to the eyelids" and the "feature figures corresponding to the iris and the pupil" described in the second embodiment (see FIG. 7). Note that the feature points corresponding to the eyelids and the feature figures corresponding to the iris and the pupil may be detected as described in the second embodiment. The line-of-sight estimation unit 140 may include a function of outputting a result of the line-of-sight estimation. Moreover, the line-of-sight estimation unit 140 may be configured to have part of the line-of-sight estimation process be executed outside of the system (for example, be executed by an external server, cloud computing, or the like).
(Flow of Operation)

Next, a flow of operation of the detection system 10 according to the third embodiment is described with reference to FIG. 9. FIG. 9 is a flowchart showing the flow of the operation of the detection system according to the third embodiment. Note that in FIG. 9, processes similar to the processes shown in FIGS. 3 and 6 are denoted by the same reference numbers as in FIGS. 3 and 6.

Figure 9:
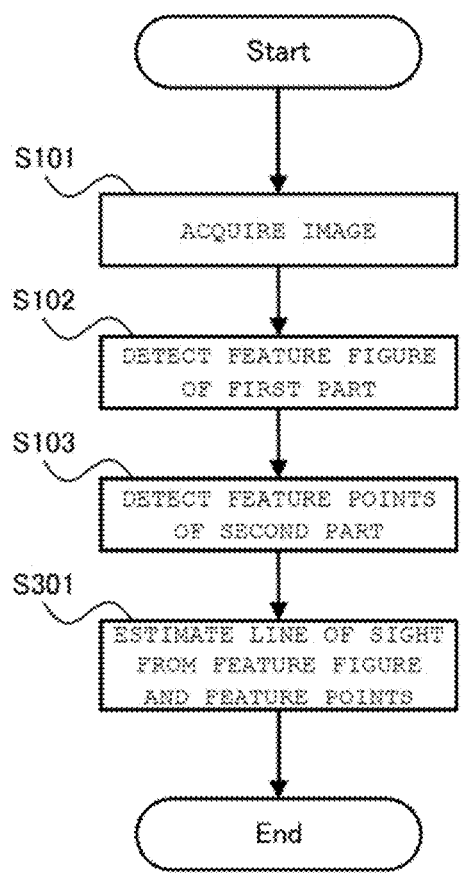
FIG. 9 is a flowchart showing a flow of operation of the detection system according to the third embodiment.

As shown in FIG. 9, when the detection system 10 according to the third embodiment operates, first, the image acquisition unit 110 acquires an image (step S101). Thereafter, the detection unit 120 detects feature figures corresponding to the first parts from the image acquired by the image acquisition unit 110 (step S102). The detection unit 120 further detects feature points corresponding to the second part from the image acquired by the image acquisition unit 110 (step S103).

Subsequently, the line-of-sight estimation unit 140 estimates a direction of a line of sight, based on the feature figures and the feature points (step S301). Note that specific processing content of the line-of-sight direction estimation is described in detail in a fourth embodiment, which will be described later.

Technical Effects

Next, technical effects achieved by the detection system 10 according to the third embodiment are described.

As described with FIGS. 8 and 9, in the detection system 10 according to the third embodiment, the line-of-sight estimation is executed by using detected feature figures and feature points. In the present embodiment in particular, since a part used to estimate the direction of the line of sight (for example, each part in and around an eye) is appropriately detected, the direction of the line of sight can be appropriately estimated.

Fourth Embodiment

A detection system 10 according to the fourth embodiment is described with reference to FIG. 10. Note that the fourth embodiment is to illustrate a more specific configuration of the above-described third embodiment (that is, a specific method for estimating the direction of the line of sight), and a configuration and a flow of operation may be similar to those of the third embodiment (see FIGS. 8 and 9). Accordingly, in the following, a description of part overlapping with the part described already is omitted as appropriate.

(Calculation of Relative Position)

A method for estimating the direction of the line of sight by the detection system 10 according to the fourth embodiment is described with reference to FIG. 10. FIG. 10 shows an example of the method for estimating the line of sight by the detection system according to the fourth embodiment.

Figure 10:
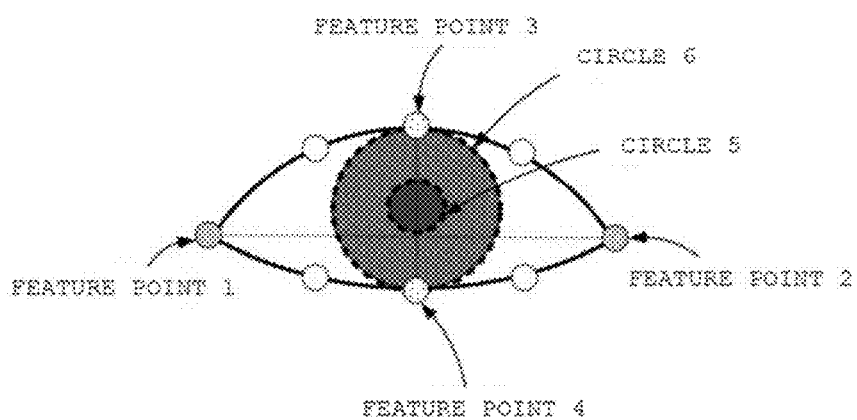
FIG. 10 shows an example of a method for estimating a line of sight by a detection system according to a fourth embodiment.

As shown in FIG. 10, in the detection system 10 according to the fourth embodiment, the direction of the line of sight is estimated by using feature points corresponding to eyelids and feature figures corresponding to an iris and a pupil. Note that the feature points corresponding to the eyelids and the feature figures corresponding to the iris and the pupil may be detected as described in the second embodiment (see FIG. 7).

Feature points 1 and 2 in the drawing are feature points corresponding to inner and outer corners of an eye, respectively. Feature points 3 and 4 are points at which a median line extended from a line between the feature points 1 and 2 intersects with the eyelids. Accordingly, the feature points 1 to 4 keep the same positions unless a direction of a face is changed, even if the eye is turned in any direction. Circles 5 and 6, which are the feature figures corresponding to the iris and the pupil, move when a direction of the eye is changed. Accordingly, if a relative relation between positions of the eyelids, which can be identified from each feature point, and positions of the iris and the pupil, which can be identified from the respective feature figures, is used, the direction of the eye (that is, the direction of the line of sight) can be estimated.

To estimate the line of sight, a correlation between the relative relation between the positions of the eyelids and the position of the eye, and which location is currently looked at may be obtained beforehand. Such correlations may be calculated as a function, or may be created as a table.

In calculation of the direction of the line of sight, first, an image is normalized by using the circle 6 corresponding to the iris. Next, an intersection of a line joining the feature points 1 and 2 with a line joining the feature points 3 and 4 is set as an origin, and the relative positional relation between the eyelids and the eye is calculated from information on how many pixels the eyelids are far from the origin in x, y directions. Then, the direction of the line of sight is estimated by using the calculated positional relation between the eyelids and the eye.

Technical Effects

Next, technical effects achieved by the detection system 10 according to the fourth embodiment are described.

As described with FIG. 10, in the detection system 10 according to the fourth embodiment, the direction of the line of sight is estimated from the positional relation between the eyelids and the eye. In the present embodiment in particular, since the positional relation between the eyelids and the iris and the pupil can be appropriately calculated from feature points corresponding to the eyelids and feature figures corresponding to the iris and the pupil, the direction of the line of sight can be appropriately calculated.

Fifth Embodiment

A detection system 10 according to a fifth embodiment is described with reference to FIGS. 11 to 13. The fifth embodiment is different from each of the above-described embodiments only in part of configuration and operation, and, for example, a hardware configuration may be similar to that of the first embodiment (see FIG. 1). Accordingly, in the following, a description of part overlapping with the embodiments described already is omitted as appropriate.

(Functional Configuration)

First, a functional configuration of the detection system 10 according to the fifth embodiment is described with reference to FIG. 11. FIG. 11 is a block diagram showing the functional configuration of the detection system according to the fifth embodiment. Note that in FIG. 11, elements similar to the constitutional elements shown in FIGS. 2, 5, and 8 are denoted by the same reference numbers as in FIGS. 2, 5, and 8.

Figure 11:
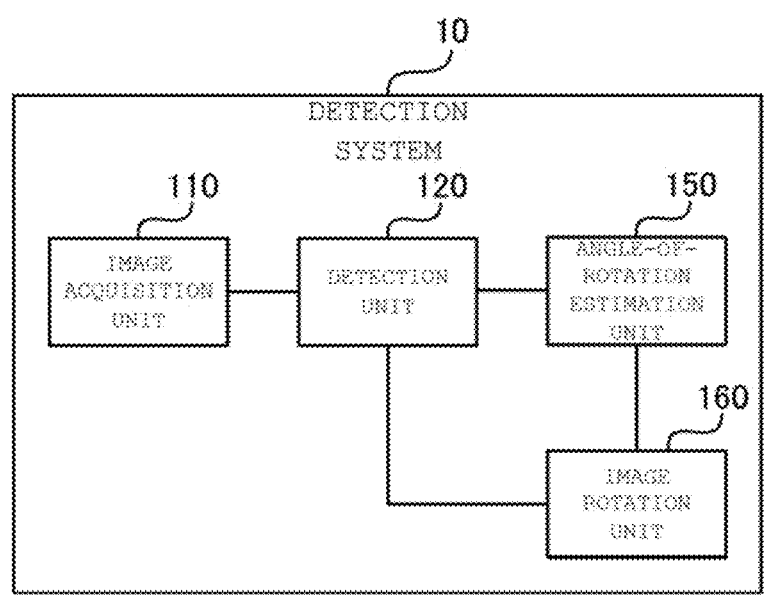
FIG. 11 is a block diagram showing a functional configuration of a detection system according to a fifth embodiment.

As shown in FIG. 11, the detection system 10 according to the fifth embodiment includes, as processing blocks for implementing functions of the detection system 10, or as physical processing circuitry, an image acquisition unit 110, a detection unit 120, an angle-of-rotation estimation unit 150, and an image rotation unit 160. In other words, the detection system 10 according to the fifth embodiment further includes the angle-of-rotation estimation unit 150 and the image rotation unit 160, in addition to the constitutional elements in the first embodiment (see FIG. 2). Note that the angle-of-rotation estimation unit 150 and the image rotation unit 160 can be implemented by, for example, the above-described processor 11 (see FIG. 1).

The angle-of-rotation estimation unit 150 can estimate an angle of rotation (that is, a slope) of an image acquired by the image acquisition unit 110, based on feature points detected by the detection unit 120. For example, when feature points of eyelids are detected as illustrated in the second embodiment and the like (see FIG. 7 and the like), the angle-of-rotation estimation unit 150 estimates the angle of rotation of the image from a slope of the detected eyelids. Note that the angle-of-rotation estimation unit 150 may be configured to estimate the angle of rotation of the image by taking a feature figure into consideration, in addition to the feature points detected by the detection unit 120. For example, when feature points of eyelids and a feature figure of an iris or a pupil are detected as illustrated in the second embodiment and the like (see FIG. 7 and the like), the angle-of-rotation estimation unit 150 may estimate the angle of rotation of the image from a positional relation between the detected eyelids and the detected iris and pupil.

The image rotation unit 160 is configured to be able to rotate the image acquired by the image acquisition unit 110, based on the angle of rotation estimated by the angle-of-rotation estimation unit 150. In other words, the image rotation unit 160 is configured to be able to execute image slope correction, based on the estimated angle of rotation. The image rotation unit 160 may include a function of storing the rotated image as the image after corrected.

(Flow of Operation)

Next, a flow of operation of the detection system 10 according to the fifth embodiment is described with reference to FIG. 12. FIG. 12 is a flowchart showing the flow of the operation of the detection system according to the fifth embodiment. Note that in FIG. 12, processes similar to the processes shown in FIGS. 3, 6, and 9 are denoted by the same reference numbers as in FIGS. 3, 6, and 9.

Figure 12:
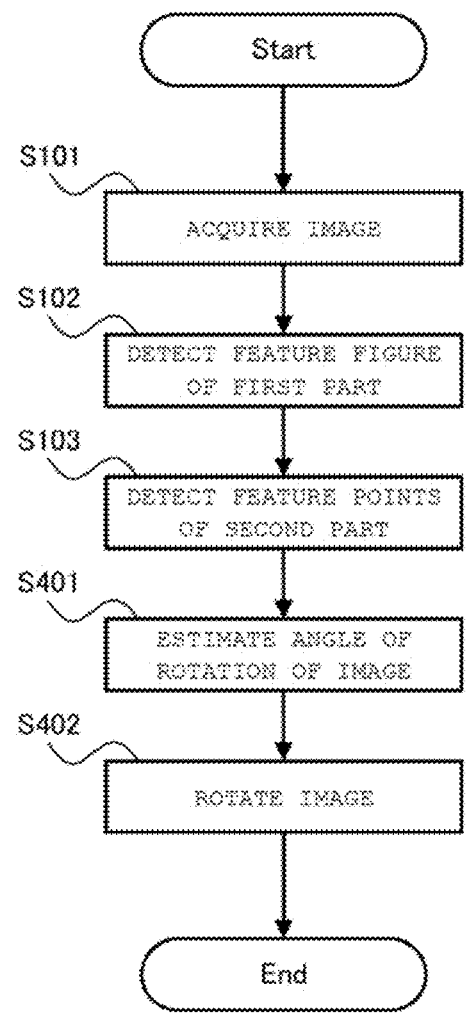
FIG. 12 is a flowchart showing a flow of operation of the detection system according to the fifth embodiment.

As shown in FIG. 12, when the detection system 10 according to the fifth embodiment operates, first, the image acquisition unit 110 acquires an image (step S101). Thereafter, the detection unit 120 detects a feature figure corresponding to the first part from the image acquired by the image acquisition unit 110 (step S102). The detection unit 120 further detects feature points corresponding to the second part from the image acquired by the image acquisition unit 110 (step S103).

Subsequently, the angle-of-rotation estimation unit 150 estimates an angle of rotation of the image, based on the detected feature points (step S401). The image rotation unit 160 rotates the image, based on the estimated angle of rotation (step S402). The image rotation unit 160, in particular, rotates the image around, as an axis of rotation, the center of an approximate circle detected as the feature figure.

(Specific Example of Operation)

Next, a specific example of operation (that is, an example of operation of rotating an image) performed by the detection system 10 according to the fifth embodiment is described with reference to FIG. 13. FIG. 13 shows the specific example of the operation performed by the detection system according to the fifth embodiment.

Figure 13:
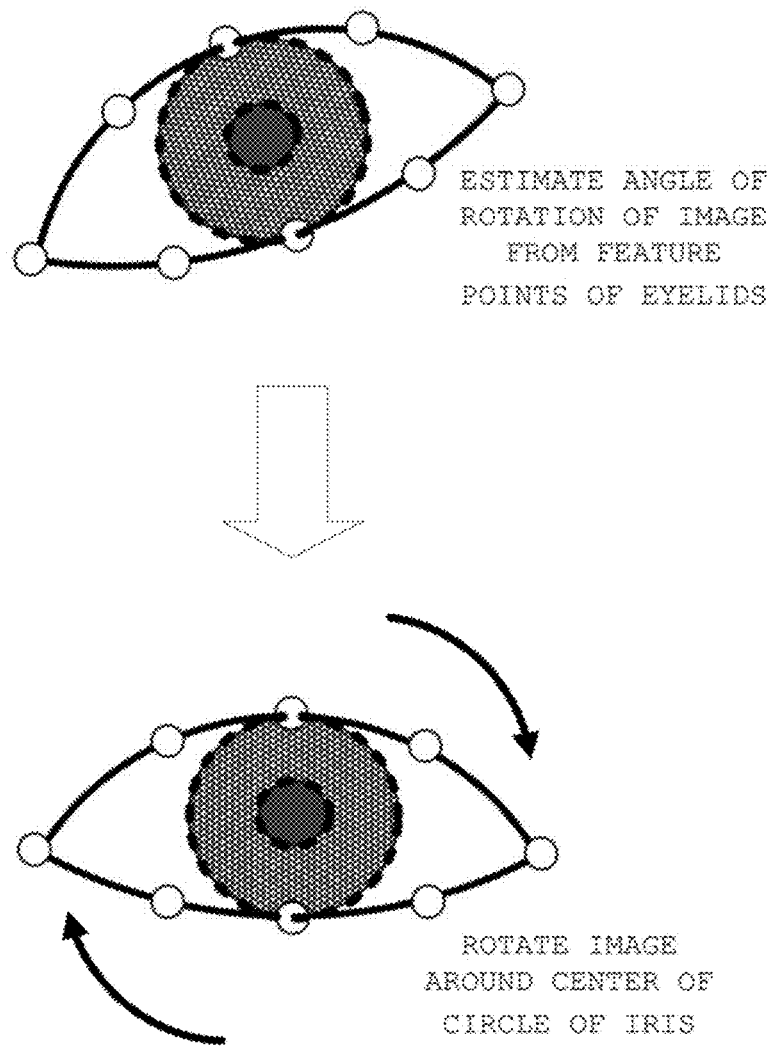
FIG. 13 shows a specific example of operation performed by the detection system according to the fifth embodiment.

As shown in FIG. 13, in the detection system 10 according to the fifth embodiment, the angle of rotation of an image is estimated from the feature points of the eyelids. In the example shown in the drawing, it can be seen that the image slopes down to the left (counterclockwise). Note that a numerical value of the angle of rotation can be calculated, for example, by comparing preset positions of the feature points at a normal time and positions of the feature points currently detected. However, for a scheme of estimating an angle of rotation based on feature points, an existing technique can be adopted as appropriate.

Subsequently, the image rotation unit 160 rotates the image by the estimated angle of rotation. In the example shown in the drawing, the image rotation unit 160 rotates the image to the right (clockwise). The image rotation unit 160, in particular, rotates the image around, as an axis of rotation, the center of the circle corresponding to the iris or the pupil detected as a feature figure. Note that when a plurality of feature figures are detected (for example, when irises or pupils of both eyes are detected), the image rotation unit 160 may rotate the image by using the center of any one of the feature figures for an axis of rotation.

Technical Effects

Next, technical effects achieved by the detection system 10 according to the fifth embodiment are described.

As described with FIGS. 11 to 13, in the detection system 10 according to the fifth embodiment, the angle of rotation of an image is estimated based on detected feature points, and the image is rotated around, as an axis of rotation, the center of a feature figure. With the configuration thus made, even when an image acquired by the image acquisition unit 110 slopes, such a slope can be appropriately corrected. Note that the image after rotated can also be used for, for example, the iris recognition described in the third embodiment, and the line-of-sight estimation described in the fourth embodiment. In such a case, since the slope has been corrected by rotating the image, the iris recognition and the line-of-sight estimation can be executed with higher accuracy.

Sixth Embodiment

A detection system 10 according to a sixth embodiment is described with reference to FIGS. 14 to 20. Note that the sixth embodiment is different from each of the above-described embodiments only in part of configuration and operation, and, for example, a hardware configuration may be similar to that of the first embodiment (see FIG. 1). Accordingly, in the following, a description of part overlapping with the embodiments described already is omitted as appropriate.

(Functional Configuration)

Figure 14:
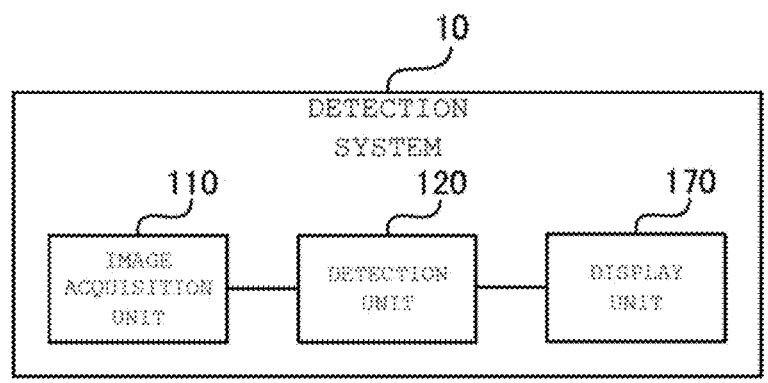
FIG. 14 is a block diagram showing a functional configuration of a detection system according to a sixth embodiment.

First, a functional configuration of the detection system 10 according to the sixth embodiment is described with reference to FIG. 14. FIG. 14 is a block diagram showing the functional configuration of the detection system according to the sixth embodiment. Note that in FIG. 14, elements similar to the constituent elements shown in FIGS. 2, 5, 8, and 11 are denoted by the same reference numbers as in FIGS. 2, 5, 8, and 11.

As shown in FIG. 14, the detection system 10 according to the sixth embodiment includes, as processing blocks for implementing functions of the detection system 10, or as physical processing circuitry, an image acquisition unit 110, a detection unit 120, and a display unit 170. In other words, the detection system 10 according to the sixth embodiment further includes the display unit 170, in addition to the constitutional elements in the first embodiment (see FIG. 2).

The display unit 170 is configured as, for example, a monitor including a display. The display unit 170 may be configured as part of the output device 16 shown in FIG. 1. The display unit 170 is configured to be able to display information related to a feature figure and feature points detected by the detection unit 120. The display unit 170 may be configured to be able to change display forms, for example, according to an operation made by a system user or the like.

(Flow of Operation)

Figure 15:
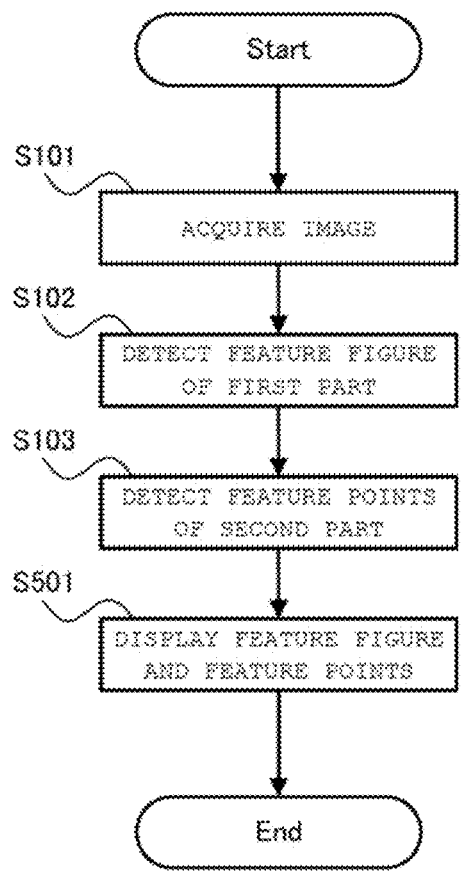
FIG. 15 is a flowchart showing a flow of operation of the detection system according to the sixth embodiment.

Next, a flow of operation of the detection system 10 according to the sixth embodiment is described with reference to FIG. 15. FIG. 15 is a flowchart showing the flow of the operation of the detection system according to the sixth embodiment. Note that in FIG. 15, processes similar to the processes shown in FIGS. 3, 6, 9, and 12 are denoted by the same reference numbers as in FIGS. 3, 6, 9, and 12.

As shown in FIG. 15, when the detection system 10 according to the sixth embodiment operates, first, the image acquisition unit 110 acquires an image (step S101). Thereafter, the detection unit 120 detects a feature figure corresponding to the first part from the image acquired by the image acquisition unit 110 (step S102). The detection unit 120 further detects feature points corresponding to the second part from the image acquired by the image acquisition unit 110 (step S103).

Subsequently, the display unit 170 displays information related to the detected feature figure and feature points (step S501). Not only the information directly related to the feature figure and the feature points, the display unit 170 may also display information that can be estimated from the feature figure and the feature points, or the like.

Display Examples

Next, examples of display rendered by the detection system 10 according to the sixth embodiment are described with reference to FIGS. 16 to 20. Note that each display example described below may be used in combination as appropriate.

First Display Example

Figure 16:
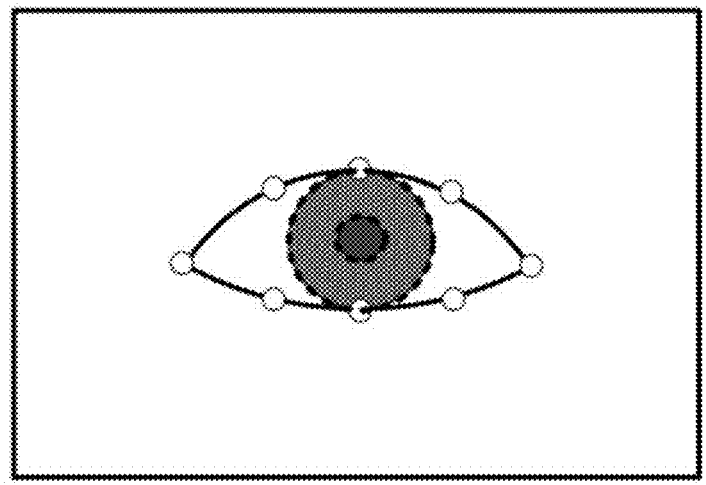
FIG. 16 is a diagram (version 1) showing an example of display of feature points and feature figures on a display unit.

A first display example is described with reference to FIG. 16. FIG. 16 is a diagram (version 1) showing an example of display of feature points and feature figures on the display unit.

As shown in FIG. 16, the display unit 170 may display an image over which the feature figures and the feature points are drawn. In such a case, the display unit 170 may be configured to display only the feature figures or the feature points. The display unit 170 may be configured to switch between presence and absence of the drawn feature figures and feature points, for example, according to an operation made by the user. When such an operation is configured to be made by the user, the display unit 170 may be configured to display an operation button (that is, a button for switching display) under the image or the like.

The display unit 170 may further display information indicating positions of the feature figures and the feature points (for example, coordinates of the feature points, formulas of the feature figures, and the like), in addition to the feature figures and the feature points. Moreover, the display unit 170 may display the feature figures and the feature points that are colored or demarcated such that ranges of regions that can be specified by the feature figures and the feature points (in the example in the drawing, an eyelid region, an iris region, and a pupil region) can be identified.

Second Display Example

Figure 17:
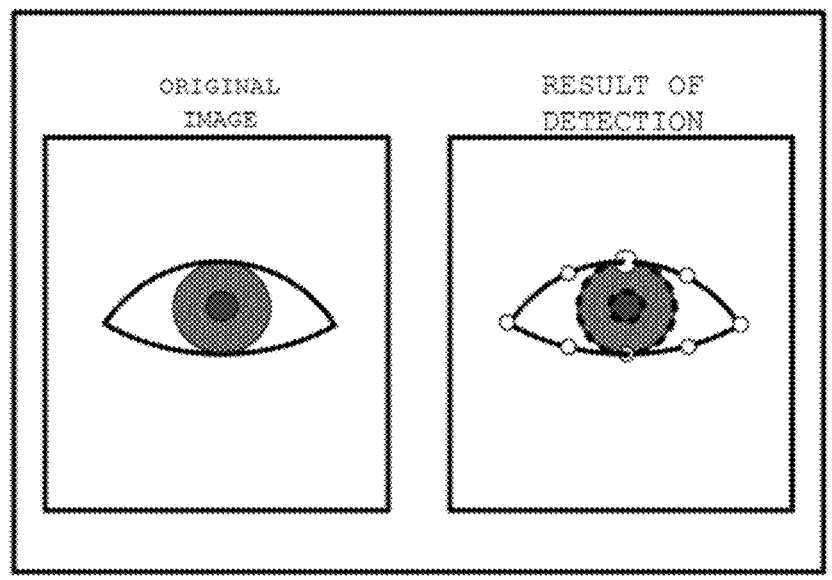
FIG. 17 is a diagram (version 2) showing an example of display of the feature points and the feature figures on the display unit.

A second display example is described with reference to FIG. 17. FIG. 17 is a diagram (version 2) showing an example of display of the feature points and the feature figures on the display unit.

As shown in FIG. 17, the display unit 170 may display an original image (that is, an input image) and a result of detection (that is, an image obtained by drawing the feature figures and the feature points over the input image) that are juxtaposed to each other. In such a case, the display unit 170 may be configured to display only any one of the original image and the result of detection, for example, according to an operation made by the user. Respective display forms for the original image and the result of detection may be configured to be able to be changed individually.

Third Display Example

Figure 18:
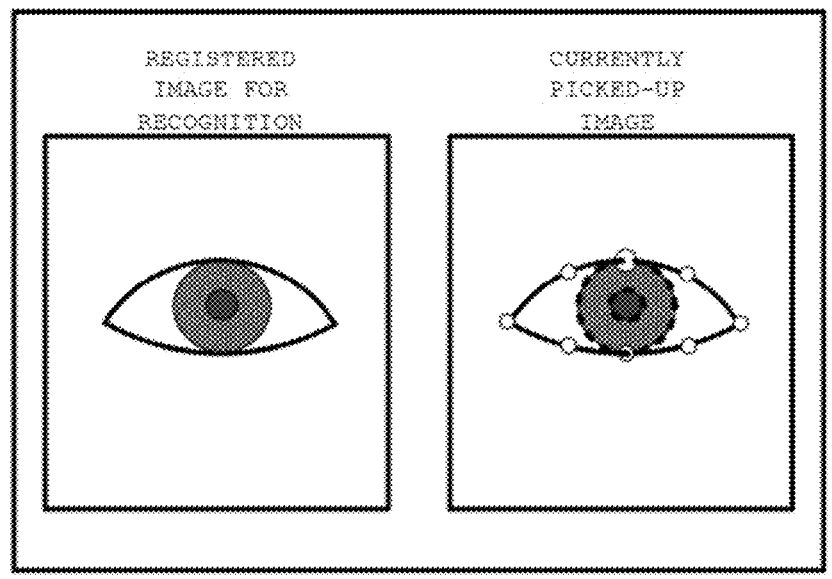
FIG. 18 is a diagram (version 3) showing an example of display of the feature points and the feature figures on the display unit.

A third display example is described with reference to FIG. 18. FIG. 18 is a diagram (version 3) showing an example of display of the feature points and the feature figures on the display unit. Note that the display example in FIG. 18 is intended for the second embodiment (that is, the configuration including the iris recognition unit 130).

As shown in FIG. 18, the display unit 170 may display a registered image for iris recognition and a currently picked-up image (that is, an image obtained by drawing the feature figures and the feature points over an input image) that are juxtaposed to each other. In such a case, the display unit 170 may be configured to display only any one of the registered image and the picked-up image, for example, according to an operation made by the user. Respective display forms for the registered image and the picked-up image may be configured to be able to be changed individually.

Fourth Display Example

Figure 19:
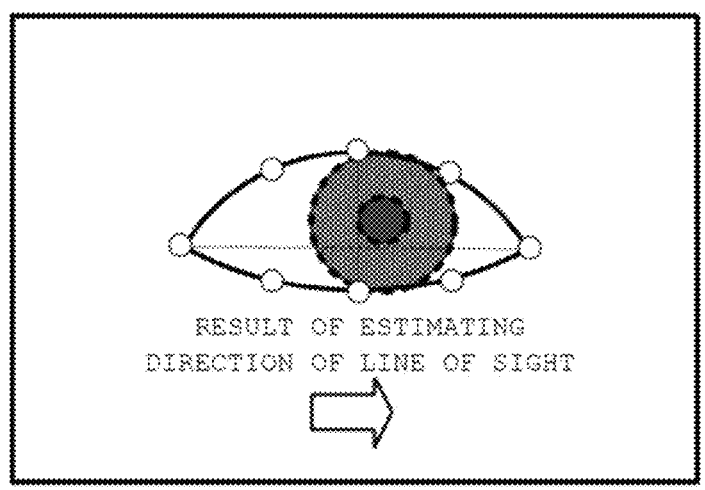
FIG. 19 is a diagram (version 4) showing an example of display of the feature points and the feature figures on the display unit.

A fourth display example is described with reference to FIG. 19. FIG. 19 is a diagram (version 4) showing an example of display of the feature points and the feature figures on the display unit. Note that the display example in FIG. 19 is intended for the third and fourth embodiments (that is, the configuration including the line-of-sight estimation unit 140).

As shown in FIG. 19, the display unit 170 may be configured to display a result of estimating a direction of a line of sight, in addition to an image over which the feature figures and the feature points are drawn. Specifically, the display unit 170 may display an arrow indicating the direction of the line of sight, as shown in the drawing. In such a case, a configuration may be made such that the more the line of sight deviates from the front, the longer or larger the arrow is made on display.

Fifth Display Example

Figure 20:
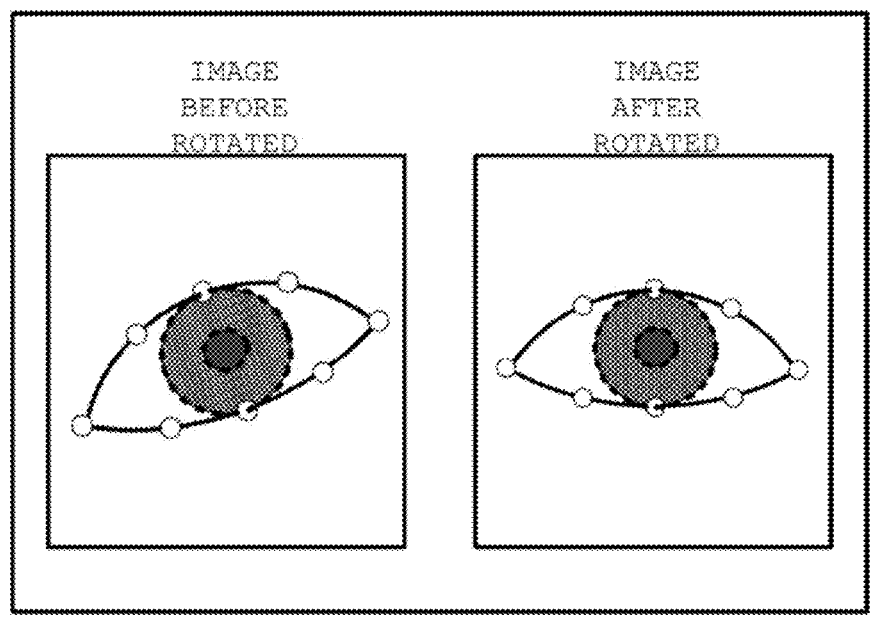
FIG. 20 is a diagram (version 5) showing an example of display of the feature points and the feature figures on the display unit.

A fifth display example is described with reference to FIG. 20. FIG. 20 is a diagram (version 5) showing an example of display of the feature points and the feature figures on the display unit. Note that the display example in FIG. 20 is intended for the fifth embodiment (that is, the configuration including the angle-of-rotation estimation unit 150 and the image rotation unit 160).

As shown in FIG. 20, the display unit 170 may display an image before rotated (that is, an image before a slope thereof is corrected) and the image after rotated (that is, the image after the slope thereof is corrected) that are juxtaposed to each other. In such a case, the display unit 170 may be configured to display only any one of the image before rotated and the image after rotated, for example, according to an operation made by the user. Respective display forms for the image before rotated and the image after rotated may be configured to be able to be changed individually.

Technical Effects

Next, technical effects achieved by the detection system 10 according to the sixth embodiment are described.

As described with FIGS. 14 to 20, in the detection system 10 according to the sixth embodiment, information related to a detected feature figure and detected feature points is displayed. Accordingly, a result of detecting the feature figure and the feature points and results of various processes using the feature figure and the feature points can be presented to the user in an easily understandable manner.

Seventh Embodiment

A detection system 10 according to a seventh embodiment is described with reference to FIGS. 21 and 22. Note that the seventh embodiment is different from each of the above-described embodiments only in part of configuration and operation, and, for example, a hardware configuration may be similar to that of the first embodiment (see FIG. 1). Accordingly, in the following, a description of part overlapping with the embodiments described already is omitted as appropriate.

(Functional Configuration)

First, a functional configuration of the detection system 10 according to the seventh embodiment is described with reference to FIG. 21. FIG. 21 is a block diagram showing the functional configuration of the detection system according to the seventh embodiment. Note that in FIG. 21, elements similar to the constitutional elements shown in FIGS. 2, 5, 8, 11, and 14 are denoted by the same reference numbers as in FIGS. 2, 5, 8, 11, and 14.

Figure 21:
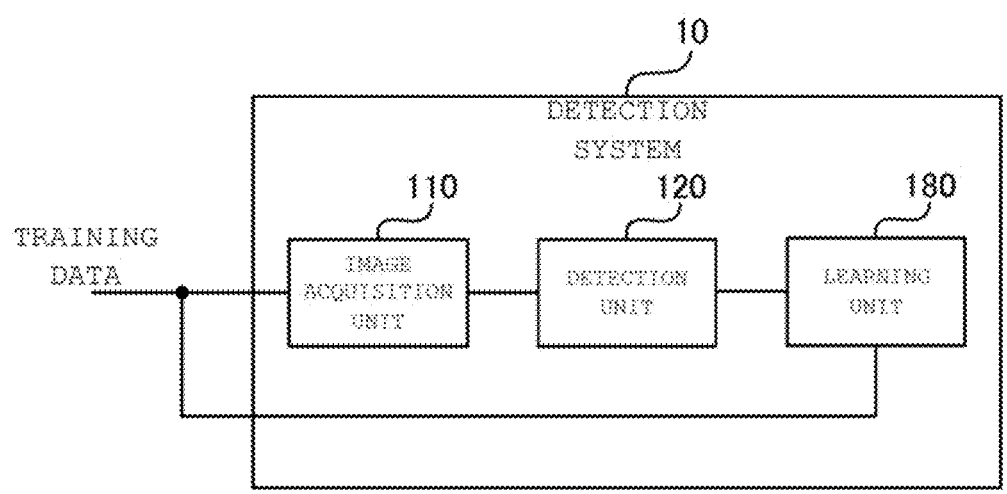
FIG. 21 is a block diagram showing a functional configuration of a detection system according to a seventh embodiment.

As shown in FIG. 21, the detection system 10 according to the seventh embodiment includes, as processing blocks for implementing functions of the detection system 10, or as physical processing circuitry, an image acquisition unit 110, a detection unit 120, and a learning unit 180. In other words, the detection system 10 according to the seventh embodiment further includes the learning unit 180, in addition to the constitutional elements in the first embodiment (see FIG. 2).

The learning unit 180 is configured to be able to learn a model (for example, a neural network model) for detecting a feature figure and feature points. When learning by the learning unit 180 is executed, the image acquisition unit 110 acquires an image that is training data. The learning unit 180 executes learning by using a feature figure and feature points detected by the detection unit 120 from the training data. In other words, the learning unit 180 executes learning by using the detected feature figure and feature points for a composite target. More specifically, the learning unit 180 executes learning by comparing a feature figure and feature points detected by the detection unit 120, to correct data on the feature figure and the feature points inputted as the training data. The learning unit 180 may be configured to have part of learning processes be executed outside of the system (for example, be executed by an external server, cloud computing, or the like).

Note that the detection system 10 according to the seventh embodiment may include a function of augmenting the inputted training data. For example, the image acquisition unit 110 may perform data augmentation, such as luminance change, vertical/horizontal shift, scaling, and rotation.

(Flow of Operation)

Next, a flow of operation of the detection system 10 according to the seventh embodiment is described with reference to FIG. 22. FIG. 22 is a flowchart showing the flow of the operation of the detection system according to the seventh embodiment. Note that in FIG. 22, processes similar to the processes shown in FIGS. 3, 6, 9, 12, and 15 are denoted by the same reference numbers as in FIGS. 3, 6, 9, 12, and 15.

Figure 22:
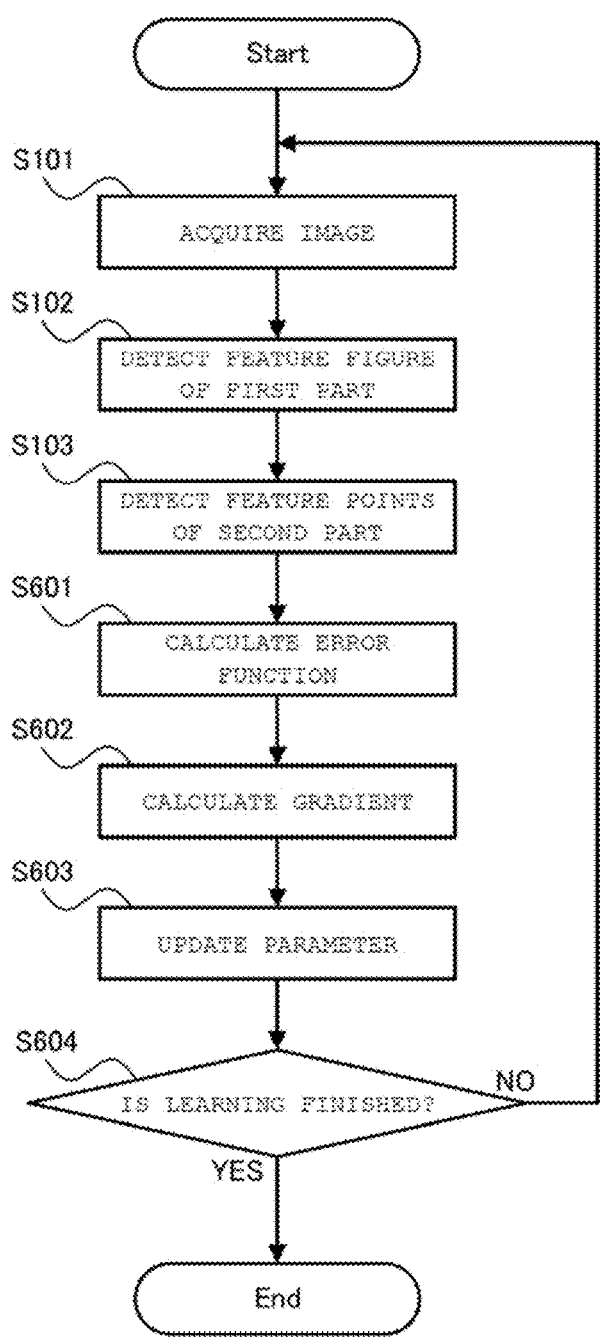
FIG. 22 is a flowchart showing a flow of operation of the detection system according to the seventh embodiment.

As shown in FIG. 22, when the detection system 10 according to the seventh embodiment operates, first, the image acquisition unit 110 acquires an image (step S101). Thereafter, the detection unit 120 detects a feature figure corresponding to the first part from the image acquired by the image acquisition unit 110 (step S102). The detection unit 120 further detects feature points corresponding to the second part from the image acquired by the image acquisition unit 110 (step S103).

Subsequently, the learning unit 180 calculates an error function from the detected feature figure and feature points (step S601). Specifically, the learning unit 180 calculates distances between vectors indicating the detected feature figure and feature points, and vectors indicating the feature figure and the feature points in the training data (that is, the correct data), and thereby calculates errors between the detected feature figure and feature points and the correct data. For a scheme of calculating the errors, for example, L1 norm or L2 norm can be used, but another scheme may be used.

Subsequently, the learning unit 180 performs error back-propagation based on the errors, and calculates a gradient of a parameter of the detection model (step S602). Thereafter, the learning unit 180 updates (optimizes) the parameter of the detection model, based on the calculated gradient (step S603). For a scheme of optimization, for example, SDG (Stochastic Gradient Descent), Adam, or the like can be used, but optimization may be performed by using another scheme. When optimizing the parameter, the learning unit 180 may perform regularization such as weight decay. When the detection model is a neural network, a layer may be included that performs regularization such as dropout or batch norm.

Note that the above-described series of learning processes (that is, steps S601 to S603) is only an example, and the learning may be executed by using another scheme as long as a feature figure and feature points can be used for a composite target.

Lastly, the learning unit 180 determines whether or not the learning is finished (step S604). The learning unit 180 determines whether or not the learning is finished, for example, based on whether or not a predetermined number of loops of the processes up to here are executed. When it is determined that the learning is finished (step S604: YES), the series of processes is terminated. When it is determined that the learning is not finished (step S604: NO), the processes are repeated from step S101.

Technical Effects

Next, technical effects achieved by the detection system 10 according to the seventh embodiment are described.

As described with FIGS. 21 and 22, in the detection system 10 according to the seventh embodiment, the learning is executed by using a feature figure and feature points for a composite target. Accordingly, the model that detects a feature figure and feature points can be optimized, and more appropriate detection can be realized.

Modification

Here, a modification of the above-described seventh embodiment is described. A configuration and operation of the modification are approximately similar to those of the seventh embodiment described already. Accordingly, in the following, part different from the seventh embodiment is described in detail, and a description of other part is omitted as appropriate.

In a detection system 10 according to the modification, the learning unit 180 executes the learning processes by using information related a distribution of a relative positional relation between a feature figure and feature points. For example, the learning unit 180 learns the model for detecting a feature figure and feature points by using distributions of positions of an iris detected as the feature figure, and positions of eyelids detected as the feature points.

Here, if the learning using the relative positional relation between the feature figure and the feature points is not performed, there is a possibility that a part that is not the iris is detected as the iris, or a part that is not the eyelids is detected as the eyelids, because each of the iris and the eyelids is detected independently of each other (that is, the relative positional relation is not taken into consideration).

However, according to the detection system 10 in the modification, since the learning is executed by taking into consideration the relative positional relation between the feature figure and the feature points, the model for detecting a feature figure and feature points can be more appropriately optimized.

<Supplementary Notes>

The above-described embodiments can also be further described as, but are not limited to, the following supplements.

(Supplementary Note 1)

A detection system described in Supplementary Note 1 is a detection system including: an acquisition unit configured to acquire an image including a living body; and a detection unit configured to detect, from the image, a feature figure corresponding to an appropriately circular first part on the living body, and feature points corresponding to a second part around the first part on the living body.

(Supplementary Note 2)

A detection system described in Supplementary Note 2 is the detection system described in Supplementary Note 1, further comprising an iris recognition unit configured to execute an iris recognition process on the living body, based on the feature figure corresponding to at least one of an iris and a pupil that are the first parts, and on the feature points corresponding to eyelids that are the second part.

(Supplementary Note 3)

A detection system described in Supplementary Note 3 is the detection system described in Supplementary Note 1 or 2, further comprising a line-of-sight estimation unit configured to execute a line-of-sight estimation process of estimating a line of sight of the living body, based on the feature figure corresponding to at least one of an iris and a pupil that are the first parts, and on the feature points corresponding to eyelids that are the second part.

(Supplementary Note 4)

A detection system described in Supplementary Note 4 is the detection system described in Supplementary Note 3, wherein the line-of-sight estimation unit is configured to estimate the line of sight of the living body, based on a relative positional relation between the feature figure corresponding to at least one of the iris and the pupil and the feature points corresponding to the eyelids.

(Supplementary Note 5)

A detection system described in Supplementary Note 5 is the detection system described in any one of Supplementary Notes 1 to 4, further comprising: an angle-of-rotation estimation unit configured to estimate an angle of rotation of the image by using the feature points corresponding to eyelids that are the second part; and an image rotation unit configured to rotate the image by the angle of rotation around, as an axis of rotation, a center of the feature figure corresponding to at least one of an iris and a pupil that are the first parts.

(Supplementary Note 6)

A detection system described in Supplementary Note 6 is the detection system described in any one of Supplementary Notes 1 to 5, further comprising a display unit configured to display the feature points and the feature figure in a display form in which the feature points and the feature figure can be individually identified.

(Supplementary Note 7)

A detection system described in Supplementary Note 7 is the detection system described in any one of Supplementary Notes 1 to 6, further comprising a learning unit configured to execute a learning process for the detection unit, by using the feature points and the feature figure detected from the image that is training data.

(Supplementary Note 8)

A detection system described in Supplementary Note 8 is the detection system described in Supplementary Note 6, wherein the learning unit is configured to execute the learning process by using information related to a relative positional relation between the feature figure and the feature points.

(Supplementary Note 9)

A detection method described in Supplementary Note 9 is a detection method including: acquiring an image including a living body; and detecting, from the image, a feature figure corresponding to an appropriately circular first part on the living body, and feature points corresponding to a second part around the first part on the living body.

(Supplementary Note 10)

A computer program described in Supplementary Note 10 is a computer program that allows a computer to: acquire an image including a living body; and detect, from the image, a feature figure corresponding to an appropriately circular first part on the living body, and feature points corresponding to a second part around the first part on the living body.

(Supplementary Note 11)

A recording medium described in Supplementary Note 11 is a recording medium on which the computer program described in Supplementary Note 10 is recorded.

Changes can be made to the present disclosure as appropriate within a scope that does not conflict with the gist or the principle of the invention that can be read from the claims and the specification in its entirety, and a detection system, a detection method, and a computer program with such changes are also incorporated within the technical idea of the present disclosure.

DESCRIPTION OF REFERENCE CODES

10 Detection system
11 Processor
110 Image acquisition unit
120 Detection unit
130 Iris recognition unit
140 Line-of-sight estimation unit
150 Angle-of-rotation estimation unit
160 Image rotation unit
170 Display unit
180 Learning unit

What is claimed is:

1. A detection system comprising:
at least one memory configured to store instructions; and
at least one processor configured to execute the instructions to:
acquire an image including a living body;
train a detection model composed of a neural network and adapted to detect, from the image, a feature figure corresponding to an iris of the living body, and feature points corresponding to an eyelid of the living body, such that the detection model takes into account a relational position between the feature figure and the features points to prevent a non-iris part of the image from being detected as the feature figure and to prevent a non-eyelid part of the image from being detected as the feature points, and such that the feature figure and the feature points are not detected independently of one another;
detect the feature figure and the feature points within the image using the trained detection model;
estimate an angle of rotation of the image using the feature points corresponding to the eyelid; and rotate the image by the estimated angle of rotation around a center of the feature figure corresponding to the iris as the axis of rotation.

2. The detection system according to claim 1, wherein the at least one processor is configured to execute the instructions to further execute a line-of-sight estimation process of estimating a line of sight of the living body, based on the feature figure and the feature points.

3. The detection system according to claim 2, wherein the line of sight of the living body is estimated based on the relational position between the feature figure and the feature points.

4. The detection system according to claim 1, wherein the at least one processor is configured to execute the instructions to further display the feature points and the feature figure in a manner in which the feature points and the feature figure are individually identifiable.

5. The detection system according to claim 1, wherein the detection model is further trained based on the relational position between the feature figure and the feature points.

6. A detection method comprising:
acquiring, by a processor, an image including a living body;
training, by the processor, a detection model composed of a neural network and adapted to detect, from the image, a feature figure corresponding to an iris of the living body, and feature points corresponding to an eyelid of the living body, such that the detection model takes into account a relational position between the feature figure and the features points to prevent a non-iris part of the image from being detected as the feature figure and to prevent a non-eyelid part of the image from being detected as the feature points, and such that the feature figure and the feature points are not detected independently of one another;
detecting, by the processor, the feature figure and the feature points within the image using the trained detection model;
estimating, by the processor, an angle of rotation of the image using the feature points corresponding to the eyelid; and
rotating, by the processor, the image by the estimated angle of rotation around a center of the feature figure corresponding to the iris as the axis of rotation.

7. A non-transitory recording medium storing a computer program executable by a computer to:
acquire an image including a living body;
train a detection model composed of a neural network and adapted to detect, from the image, a feature figure corresponding to an iris of the living body, and feature points corresponding to an eyelid of the living body, such that the detection model takes into account a relational position between the feature figure and the features points to prevent a non-iris part of the image from being detected as the feature figure and to prevent a non-eyelid part of the image from being detected as the feature points, and such that the feature figure and the feature points are not detected independently of one another;
detect the feature figure and the feature points within the image using the trained detection model;
estimate an angle of rotation of the image using the feature points corresponding to the eyelid; and
rotate the image by the estimated angle of rotation around a center of the feature figure corresponding to the iris as the axis of rotation.

* * * * *